United States Patent Office 3,442,749
Patented May 6, 1969

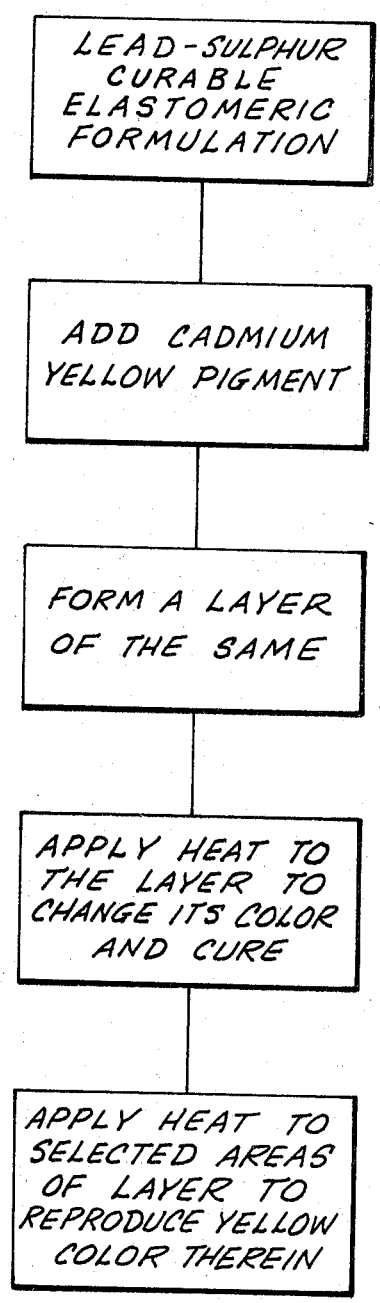

3,442,749
THERMAL COLOR CHANGE MARKING OF ELASTOMERS
Fred L. Ward, Bellevue, and Edwin A. Thompson, Seattle, Wash., and Harold D. Ritchie, Huntsville, Ala., assignors to The Boeing Company, Seattle, Wash., a corporation of Delaware
Continuation-in-part of application Ser. No. 232,120, Oct. 22, 1962. This application Aug. 6, 1965, Ser. No. 477,944
Int. Cl. B44f 5/00
U.S. Cl. 161—33
9 Claims

ABSTRACT OF THE DISCLOSURE

A marked elastomer is disclosed together with a method for producing it. In the method, heat is applied locally to a selected area or areas of a surface of an elastomeric article which has lead sulfide and cadmium yellow pigment therein, and a dark olive green color, to change the color of such area or areas to the yellow of the pigment, while the olive green color of the remainder of the surface is maintained, to provide a dark contrasting background for the yellow colored area or areas thereon. In a typical example, the article is formed by heat curing a layer of cadmium yellow pigmented lead sulphur curable elastomer having at least a partial curing capacity, and a curing system for the same therein including a basic lead salt in excess of its curing capacity and a thermally decomposable compound at the temperatures of cure which produces sulfide ion on decomposition.

---

This application is a continuation-in-part of our copending application Ser. No. 232,120 filed Oct. 22, 1962 and entitled, "Thermal Color Change Marking." The aforesaid application is now abandoned.

This invention relates to the marking of rubber goods for identification or other such purposes and more particularly to the labeling or marking of an elastomer by means of yellow characters set against a dark olive green background. It was especially developed for identifying rubber-jacketed electrical cable.

Several methods are in use for identifying electrical cable. For example, aluminum "chicken bands" are widely used for this purpose but have the disadvantage of cutting into and possibly through the elastomeric jacket covering the cable. Heat engraving is also used but the filled depressions do not leave characters of sufficient depth to assure color permanence when the cable is subjected to abrasion. Serialization also requires frequent changes in the heat-engraving characters. A third approach, molding, also requires frequent changes in the molding tool when serialization is attempted, and in addition, application of the color fill to the depressed areas is a separate time-consuming operation.

There is, therefore, a definite need for a simple and economic technique for marking rubber goods of this nature and in particular one which produces a durable and reliable result.

The present invention has the primary objective of filling this need and especially with regard to marking cable jackets. Other objectives include providing a simple economical marking technique in which the marking operation is carried out by pressing a heated embossed metal plate or other such heated marking means against one surface of the elastomer. The operation can be used to print either a few or many markings of a kind and is especially suited to serialization marking.

Other objects will become apparent from the description following.

In short, we have found that it is possible to produce a marked elastomer by using a cadmium yellow-pigmented elastomer of the lead-sulphur curable type and subjecting the elastomer to two thermal color change steps. The elastomer is formed as a layer having at least a partial curing capacity, and the curing system in the same includes a basic lead salt in excess of this curing capacity, together with a thermally decomposable compound at the temperatures of cure which produces sulfide ion on decomposition. The first color change step involves aplying heat to the layer as a whole to cure the same and to change its color to a dark olive green. The olive green provides a deep rich background for the identification characters which are subsequently developed by applying heat locally to selected areas on one side of the cured layer to reproduce the yellow color of the pigment in such areas. The lead-sulphur curable elastomers to which the invention is applicable include natural rubber, Buna S or SBR, neoprene, nitrile rubber, acrylic rubber, butyl rubber, polyurethane, Thiokol a trademark of Thiokol Chemical Co., Trenton, N.J. for a line of elastomers produced by the reaction between dichlorodiethyl formal and an alkali polysulfide, the chlorosulphonated polyethylenes such as Hypalon, and Nordel (a trademark of E. I. du Pont de Nemours & Co., Wilmington, Del., for EPT rubber, that is, an ethylene propylene diene terpolymer which is vulcanizable with sulphur) or other EPT rubber. The term "partial curing capacity" is intended to embrace both the wholly uncured elastomer and that which has a residual curing capacity. The elastomer may take the form of the rubber goods per se as for example a cable sheath, or it may take the form of a patch which is adhered to the rubber goods. In addition, the patch may have a laminar cross section as a consequence of the layer being formed on the surface of another and different lead-sulphur curable elastomer having remaining curing capacity, and the two elastomers being cured together. This latter technique is particularly suitable to the fabrication of neoprene identification patches for application to neoprene jacketed electrical cables. The neoprene patch is preferably a lamination of Hypalon on a layer of neoprene.

A cadmium yellow, that is, cadmium sulfide pigment, is needed. Other yellow pigments such as Hansa yellow and chrome yellow are not operable. X-ray defraction analysis or the darkened layer in each of the examples given hereinafter indicates a good concentration of lead sulfide. It is believed that this initial color change results from the presence of a sulfide precipitable lead compound as $PbCl_2$ in the curing operation which reacts with the sulfide ion to produce lead sulfide. On the other hand, X-ray defraction studies following the second color change reveal the presence of lead oxide and cadmium oxide. The presence of lead oxide is explained by the fact that lead sulfide decomposes when heated in air to produce lead oxide and lead sulfate. Pitting and erosion in the press surfaces of certain marking plates also suggest that the sulphur is driven off so that the yellow pigment is "unmasked" to reproduce the yellow color. In addition, it may also be that the lead oxide exists in the rhombic B form which is yellow at the temperatures used.

Ordinary curing temperatures and periods are used in the initial heating step. Plate temperatures between 550 and 850° F. and periods of 4–5 seconds or more are used in the second heating step, depending on the dwell period. The sole figure of the drawing is a black diagram of the specific method steps involved in this invention.

Example 1

In an example of the inventive technique using a Hypalon 20 (a trademark of E. I. du Pont de Nemours & Co., Wilmington, Del., for chlorosulfonated polyethylene) base, a formulation of the following description was milled and applied to a PVA parting film by extrusion or spraying.

| | Lbs. | Ozs. |
|---|---|---|
| Hypalon 20 | 0 | 12½ |
| Tri Mal (tribasic lead maleate) | 0 | 5 |
| Cadmium Yellow X-13 | 0 | 1¼ |
| Blend: | | |
| Citric Acid | 0 | 0¼ |
| Butanol | 0 | 0¼ |
| Sundex 53 (plasticizer) | 0 | 0¾ |
| Whiting | 0 | 4 |
| Altax (benzothiazyl disulfide) | 0 | 0⅟₁₆ |
| Tetrone A (dipentamethylene thiuram tetrasulfide) | 0 | 0¼ |
| Stabelite Resin (N, N dephenylethylene diamine) | 0 | 0⁵⁄₁₆ |
| | 1 | 8⅝ |

After the applied mix was rolled into a sheet of approximately .003 inch in thickness and allowed to dry tack free, the sheet was baked at a temperature of 290° F. ±20° F. for one and one-half hours ± one-quarter hour. During this period the first color change occurred. Initially the sheet had the yellow color of the cadmium pigment, but at the close of the curing operation it took on a dark olive green color.

Preferably the sheet should not exceed .040 inch in thickness.

The second color change was produced in selected areas of one side of the sheet by means of an embossed steel marking plate heated to a temperature of 800° F. and applied for 5 seconds. Those areas of the sheet contacted by the raised portions of the plate were changed to the original yellow color of the pigment.

Example 2

In a further example the following formulation was milled in several batches and each was applied to a parting film.

| | Lbs. | Ozs. |
|---|---|---|
| Hypalon 20 | 0 | 12½ |
| Tri Mal | 0 | 5 |
| Blend: | | |
| Citric Acid | 0 | 0¼ |
| Butanol | 0 | 0¼ |
| Cadmium Yellow Y-13 | 0 | 5 |
| Sundex 53 | 0 | 0¾ |
| Tuads [1] | 0 | 0⅟₁₆ |
| Stabelite Resin | 0 | 0¾ |
| | 1 | 8⁵⁄₁₆ |

[1] A trademark of R. T. Vanderbilt Co., Inc., New York, N.Y., for its ethyl or methyl thiuram disulphide accelerator for vulcanizable rubber compounds.

Added Tetrone A

Each batch had a varying amount of the Tetrone A added thereto and it was noted that the intensity of the first color change to olive green was dependent on the amount of added Tetrone A.

Example 3

As further examples each of the following formulations was also milled and rolled into a sheet but failed to produce either or both of the color changes because of the change in the pigment used.

| | Lbs. | Ozs. |
|---|---|---|
| Hypalon 20 | 0 | 12½ |
| Tri Mal | 0 | 5 |
| Blend: | | |
| Citric Acid | 0 | 0¼ |
| Butanol | 0 | 0¼ |
| Kentucky Yellow 4-0 | 0 | 3 |
| Whiting | 0 | 3 |
| Sundex 53 | 0 | 0¾ |
| Stabelite Resin | 0 | 0⅜ |
| Tetrone A | 0 | 0⁵⁄₁₆ |
| | 1 | 9⁷⁄₁₆ |

| | Lbs. | Ozs. |
|---|---|---|
| Hypalon 20 | 0 | 12½ |
| Tri Mal | 0 | 5 |
| Blend: | | |
| Citric Acid | 0 | 0¼ |
| Butanol | 0 | 0¼ |
| Hansa Yellow | 0 | 1¼ |
| Multiflex M [1] | 0 | 2 |
| Whiting | 0 | 4 |
| Sundex 53 | 0 | 0¾ |
| Tuads | 0 | 0⅟₁₆ |
| Stabelite Resin | 0 | 0⅜ |
| | 1 | 10⁹⁄₁₆ |

[1] A brand name of Diamond Alkali Co., Cleveland, Ohio, for a fine calcium carbonate.

Example 4

The neoprene formulation given below was similarly milled, rolled and baked for an hour and one-half at 300° F. The second color change was effected at a temperature of 610° F. over a period of 5 seconds.

| | Lbs. | Ozs. |
|---|---|---|
| Neoprene Type W | 0 | 12½ |
| Tri Mal | 0 | 5 |
| Blend: | | |
| Citric Acid | 0 | 0¼ |
| Butanol | 0 | 0¼ |
| DuPont Yellow GD | 0 | 1 |
| Barytes | 0 | 6 |
| Sundex 53 | 0 | 0¾ |
| NA 22 (2-mercaptoimide azoline) | 0 | 0⅟₁₆ |
| | 1 | 9¹³⁄₁₆ |

In each of the above examples the citric acid and butanol blend was used to effect a more uniform mixture of the ingredients and a more positive color change at each stage.

Example 5

A neoprene and Hypalon blend of the following formulation also produced the desired color change in each of the stages.

| | Lbs. | Ozs. |
|---|---|---|
| Neoprene GN [1] | 0 | 10 |
| Hypalon 20 | 0 | 2¼ |
| Tri Mal | 0 | 5 |
| Whiting | 0 | 5 |
| Blanc Fixe | 0 | 5 |
| Yellow GD | 0 | 2 |
| Zinc Oxide | 0 | 0⅝ |
| Stearic Acid | 0 | 0⅟₁₆ |
| Altax | 0 | 0⅟₁₆ |
| Citric Acid (Powder) | 0 | 0¼ |
| | 1 | 14½ |

[1] A trademark of E. I. du Pont de Nemours & Co., Wilimington, Del. or its general purpose chloroprene rubber.

Example 6

Mixes resembling that of Example 1 were made up with lead sulfide and lead sulfate added in a finely ground condition. Neither addition produced any change and appeared to act only as a filter.

Example 7

In this example a laminar product was obtained by first milling and rolling a neoprene base material containing lead oxide and tetraethyl thiuram disulfide in addition to aromatic petroleum oil and polyalkylene glycol. The sheet was given a uniform thickness of .035 inch ± .005 inch so as to conform with ease to a cable jacket when used as an identification patch. Next a .003 inch spray coating of cadmium yellow pigmented chlorosufonated polyethylene base material was applied in several stages to the neoprene sheet with each coating being allowed to dry tack free between stages. In addition to the chlorosulfonated polyethylene resin the material also contained as essential ingredients a basic lead salt and a sulfide producer in the form of tetraethyl thiuram disulfide. Since the spray coated sheet could be transferred directly to an oven without rolling the same, it was not necessary to allow it to lose its tackiness beforehand. In the oven the sheet was baked at 290° F. ± 10° F. for one and one-half hours ± one-quarter hour. During this operation the initial yellow color changed to a dark olive green color.

Since it was intended to divide the sheet into identification patches for use on electrical cable, the next steps were to apply an adhesive to the unsprayed side of the neoprene sheet and to cover the adhesive with a protective easily-released backing paper. The coated surface of the sheet was then brought into contact for 4–5 seconds with an embossed addressoplate heated to 610° F. to produce characters in the contrasting yellow color. The characters were sharp and easy to read and remained clear for twenty-four hours after exposure to 160° F.

Repeated use of the addressoplate caused a carbon build up on the plate but it was found that this could be alleviated by applying a light coating of Dow-Corning high vacuum grease (a silicone) to the surface of the sulphonated polyethylene before the addressograph operation.

What is claimed is:

1. An elastomeric article comprised of chlorosulphonated polyethylene and having a limited area or areas on one surface thereof pigmented in a cadmium yellow color, and the remainder of the surface pigmented in an olive green color which changes to the yellow color on the application of heat thereto.

2. An elastomeric article according to claim 1 wherein the olive green portions of the article contain lead sulfide and cadmium yellow pigment.

3. In the process of marking the surface of an elastomeric article which has lead sulfide and cadmium yellow pigment therein, and a dark olive green color, the step of applying heat locally to a selected area or areas of the surface, to change the color of such area or areas to the yellow of the pigment, while maintaining the olive green color of the remainder of the surface to provide a dark contrasting background for the yellow colored area or areas thereon.

4. The method according to claim 3 wherein the elastomer is a chlorosulphonated polyethylene.

5. The process according to claim 3 wherein the article is tubular in shape.

6. The process according to claim 3 wherein the article is patch-shaped for application to another article as a label.

7. The process according to claim 3 wherein the heat is applied with an embossed marking plate.

8. The method of claim 3 wherein the article is made by forming a layer of cadmium yellow pigmented lead-sulphur curable elastomer having at least a partial curing capacity and a curing system for the same therein including a basic lead salt in excess of said curing capacity and a thermally decomposable compound at the temperatures of cure which produces sulfide ion on decomposition, and applying heat to the layer as a whole to cure the same and to change its color to a dark olive green.

9. The method according to claim 1 wherein the layer is formed on a surface of another and different lead sulphur curable elastomer having at least a partial curing capacity, and bonded to said surface of said other elastomer by simultaneously curing the two elastomers.

References Cited

UNITED STATES PATENTS

| | | | |
|---|---|---|---|
| 2,985,216 | 5/1961 | Williams et al. | 156—277 XR |
| 3,091,562 | 5/1963 | Berlepsch et al. | 156—245 |
| 1,924,793 | 8/1933 | Laske | 134—99 |
| 2,261,473 | 11/1941 | Jennings | 73—356 XR |
| 2,968,637 | 1/1961 | Bowers | 260—4 |
| 3,078,182 | 2/1963 | Crone et al. | 117—68.5 |

EARL M. BERGERT, *Primary Examiner.*

G. W. MOXON II, *Assistant Examiner.*

U.S. Cl. X.R.

156—277; 161—256, 410

UNITED STATES PATENT OFFICE
CERTIFICATE OF CORRECTION

Patent No. 3,442,749　　　　　　　　　　　　　　　　　May 6, 1969

Fred L. Ward et al.

It is hereby certified that error appears in the above numbered patent requiring correction and that the said Letters Patent should read as corrected below.

Column 6, line 26, delete "1" and insert -- 8 --.

Signed and sealed this 28th day of October 1969.

(SEAL)
Attest:

EDWARD M. FLETCHER, JR.　　　　　　　　　　WILLIAM E. SCHUYLER, JR.
Attesting Officer　　　　　　　　　　　　　Commissioner of Patents